United States Patent [19]

Morshedi et al.

[11] Patent Number: 4,616,308

[45] Date of Patent: Oct. 7, 1986

[54] DYNAMIC PROCESS CONTROL

[75] Inventors: Abdol M. Morshedi; Charles R. Cutler, both of Houston; Thomas J. Fitzpatrick, Katy; Thomas A. Skrovanek, Houston, all of Tex.

[73] Assignee: Shell Oil Company, Houston, Tex.

[21] Appl. No.: 803,797

[22] Filed: Dec. 2, 1985

Related U.S. Application Data

[63] Continuation of Ser. No. 552,567, Nov. 15, 1983, abandoned.

[51] Int. Cl.$^4$ ............................................. G06F 15/46
[52] U.S. Cl. .................................... 364/159; 364/172; 364/500
[58] Field of Search ............................... 364/148–159, 364/164, 165, 172, 500

[56] References Cited

U.S. PATENT DOCUMENTS

| | | | |
|---|---|---|---|
| 3,862,403 | 1/1975 | Kurihara | 364/159 |
| 3,891,836 | 6/1975 | Lee | 364/158 |
| 4,169,283 | 9/1979 | Lewis | 364/159 |
| 4,349,869 | 9/1982 | Prett et al. | 364/159 |
| 4,374,422 | 2/1983 | O'Keefe, Jr. et al. | 364/164 X |

OTHER PUBLICATIONS

"Nonlinear Programming—Theory and Algorithms", M. S. Bazaraa et al., John Wiley and Sons, Inc., 1979, pp. 63, 64, 211–214, 447 and 448.

Primary Examiner—Jerry Smith
Assistant Examiner—Allen MacDonald

[57] ABSTRACT

A method of controlling a process having a plurality of independently controlled, manipulated variables and at least one controlled variable which is dependent on the manipulated variables. In the first step of the method data is gathered about the process by introducing test disturbances in the manipulated variables and measuring the effect of the disturbances on the controlled variable. The value of the controlled variable is measured at a first time. Using the data gathered from the test disturbances and the measured value of the controlled variable, a first set of changes in at least one of the manipulated variables is calculated such that the controlled variable is driven towards its set point without exceeding a predetermined limit. The manipulated variables are adjusted in accordance with at least one change from the first set of calculated changes. The values of the manipulated variables and the controlled variable are then measured at a second time. A second set of changes in at least one of the manipulated variables is calculated using the first set of changes and the measured values at the second time. This second set of changes is calculated such that the controlled variable is driven towards its set point without exceeding a predetermined limit. The manipulated variables are adjusted in accordance with at least one change from the second set of changes.

13 Claims, 8 Drawing Figures

DYNAMIC PROCESS CONTROL

This is a continuation, of application Ser. No. 552,567, filed Nov. 15, 1983, now abandoned.

BACKGROUND OF THE INVENTION

This invention relates to a method of dynamic matrix control for a process or series of processes in an industrial environment, for example, in a petroleum refining or processing plant.

The dynamic matrix control method described in U.S. Pat. No. 4,349,869 is a multivariable control technique incorporating feedforward and feedback control. The feedforward aspect is included by prediction of the future response of the process to changes in both manipulated variables and measurable disturbances, while feedback is accounted for by modification of this prediction through readback from the process. The prediction of process responses to changes in inputs is based upon previous plant testing, during which changes in the manipulated variables are introduced and the resulting changes in the controlled variables are recorded. Constraints on the size of moves and high or low limit checking on the manipulated variables is also included in the technique. If a limit is met in one manipulated variable, this variable is no longer used for control and the remaining manipulated variables are modified to take this into account and control the process.

The prior art method of dynamic matrix control determines a set of moves for the manipulated variables which will minimize the deviation of the controlled variables from their respective set points over a predetermined interval. However, it does not provide for constraints or limits on controlled variables. Therefore, the set point for the controlled variables cannot be placed at or near a limit point for that controlled variable, since the limit may be exceeded during the deviation of the controlled variable about its set point as the manipulated variables are moved. Generally, it has been the practice to move the set point from the minimum or maximum limitation by a safety margin to ensure the safety of personnel and equipment and continuity of the process. This safety margin usually results in lower efficiency or yield from the process. In addition, the prior art method of dynamic matrix control could not directly determine a set of moves for the manipulated variables to drive the controlled variables to their respective set points and limit the manipulated variables to a predetermined limit. Rather, the prior art method determined a set of moves and then checked to see if the manipulated variables would violate a limit. If one of the manipulated variables would violate a limit if the moves were implemented, it was necessary to determine a new set of moves for the manipulated variables. The new set of moves would have to be limit checked before it could be implemented. This procedure would have to be repeated until a set of moves is determined which does not violate the limits for the manipulated variables.

Therefore, it is an object of the present invention to provide a method of dynamic matrix control which limits one or more of the controlled variables to a maximum/minimum limit.

In addition, it is an object of the present invention to provide a method of dynamic matrix control which determines a set of moves for the manipulated variables which drive the controlled variables towards their set points and prevents one or more of the manipulated variables from exceeding a predetermined limit.

SUMMARY OF THE INVENTION

In accordance with the present invention there is provided a method of controlling a process having a plurality of independently controlled, manipulated variables and at least one controlled variable which is dependent on the manipulated variables. In the first step of the method data is gathered about the process by introducing test disturbances in the manipulated variables and measuring the effect of the disturbances on the controlled variable. The value of the controlled variable is measured at a first time. Using the data gathered from the test disturbances and the measured value of the controlled variable, a first set of changes in at least one of the manipulated variables is calculated such that the controlled variable is driven towards its set point without exceeding a predetermined limit. The manipulated variables are adjusted in accordance with at least one change from the first set of calculated changes. The values of the manipulated variables and the controlled variables are then measured at a second time. A second set of changes in at least one of the manipulated variables is calculated using the first set of changes and the measured values at the second time. This second set of changes is calculated such that the controlled variable is driven towards its set point without exceeding a predetermined limit. The manipulated variables are adjusted in accordance with at least one change from the second set of changes. The changes in the manipulated variables based on the first and second sets of changes have the effect of driving the controlled variable towards its set point while ensuring that the controlled variable does not exceed its limit. This limit can be either a maximum, minimum or range for the controlled variable. The formulation of the sets of changes is preferably performed by combining either the quadratic programming or linear programming method of optimization with the method of dynamic matrix control. However, an interative method of optimization, having a nonlinear objective function subject to constraints, can be employed in place of the quadratic or linear programming.

If the process contains a variable that is dependent on the manipulated variables and that is uncontrolled (no set points), this uncontrolled variable can also be constrained to a predetermined limit, provided that the number of manipulated variables is greater than or equal to the number of controlled variables. In this embodiment the first and second sets of changes are calculated such that the uncontrolled variable is limited to a predetermined limit.

In addition, the present invention provides a method of controlling a process having a plurality of independently controlled, manipulated variables which are limited to a predetermined limit and at least one controlled variable which is dependent on the manipulated variables. Data is gathered about the process by introducing test disturbances in the manipulated variables and measuring the effect of the disturbances on the controlled variable. The value of the controlled variable is measured at a first time. Using the data gathered from the test disturbances and the measured value of the controlled variable, a first set of changes in at least one of the manipulated variables is calculated by quadratic or linear programming such that at least one of the manipulated variables is limited to a predetermined limit and such that the controlled variable is driven towards its set point. The manipulated variables are adjusted in accordance with at least one change from the first set of calculated changes. The values of the manipulated variables and the controlled variables are then measured at a second time. A second set of changes in at least one of the manipulated variables is calculated using the first set of changes and the measured values at the second time. This second set of changes is calculated by quadratic or linear programming such that at least one of the manipulated variables is limited to a predetermined limit and such that the controlled variable is moved towards its set point. The manipulated variables are adjusted in accordance with at least one change from the second set of changes. The changes in the manipulated variables based on the first and second sets of changes have the effect of moving the controlled variable towards its set point while ensuring that at least one of the manipulated variables does not exceed its limit. This limit can be either a maximum, minium or range for the manipulated variable.

Other objectives, advantages and applications of the present invention will be made apparent by the following detailed description of the preferred embodiments of the present invention.

DETAILED DESCRIPTION OF THE PREFERRED EMBODIMENTS

Dynamic matrix control as disclosed in U.S. Pat. No. 4,349,869 involves compiling a matrix of values which relate inputs or manipulated variables, measurable disturbances, and time variant and invariant constraints on the one hand to the outputs or controlled variables of a series of interdependent processes on the other. This matrix serves as a model of the process or processes sought to be controlled. Modeling of the process is achieved via perturbation tests on the manipulated variables of the unit to be controlled and measuring the effect of the perturbation on the controlled variables. Using the test data, it is possible to predict in a feedforward manner the effects on the process of changes in the manipulated variables and measurable disturbances. This information is used to form a vector projection through time of the deviations of the controlled variables from their respective set points. Using a least squares minimization approach to solve the matrix, the projection can be used to derive an optimal vector projection of moves through time on each manipulated variable to return each controlled variable to its set point. However, because of the possibility of unmeasurable disturbances entering the process, the complete vector of moves for each manipulated variable is not implemented without first checking the controlled variables' projection against the actual feedback. Generally, only the first move is actually implemented whereupon the problem is solved again with the new feedback information. In this way, unmeasurable disturbances and errors in the modeling technique can be accounted for via the process feedback.

Dynamic matrix control has the ability to account for both time variant and time invariant process constraints. Generally, the time variant constraints are dealt with in a real time solution fashion, but the time invariant constraints are included in an off-line manner, thus increasing the efficiency of on-line operation of the control method.

Dynamic matrix control can handle multivariable interactive control problems for any system that can be described or approximated by a set of linear differential equations. The method provides a continuous projection of a system's future outputs for the time horizon required for the system to come to steady state. The projected output responses are based on all past changes in the measured input variables. The optimality of the controller is based upon finding the set of time dependent changes for the manipulated input that minimize the error from the set point of the projected outputs over the time horizon.

Figure 1:
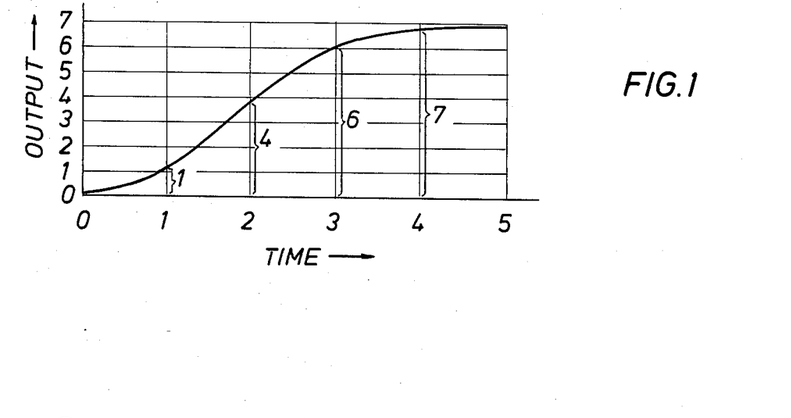
FIG. 1 is a graph showing the response of a system to a step change in an input at time zero.

The response of a system to a step change in an input $\Delta I$ is shown in FIG. 1. The change in the output $\delta O$ from its steady state value at discrete intervals of time can be represented by a vector of numbers. Subscripts are used to identify the time interval.

$$\delta O_1 = 1 * \Delta I \qquad (1)$$

$$\delta O_2 = 4 * \Delta I \text{ or } \Delta O_i = a_i \Delta I$$

$$\delta O_3 = 6 * \Delta I$$

$$\delta O_4 = 7 * \Delta I$$

The $\Delta I$ is a step change in the input at the beginning of the first interval and the output change $\delta O_i$ is relative to the time at which the input changed. In general, the $\Delta$ on an input will represent the change from one time interval to the next, while the $\delta$ on the output is the cumulative change in the output starting at the time interval when the input change occurs.

For a two unit change in the input to the system displayed in FIG. 1, the dynamic response of the system is determined by multiplying the vector of numbers by 2:

$$\delta O_1 = a_1 * \Delta I = 1 * 2 = 2 \qquad (2)$$

$$\delta O_2 = a_2 * \Delta I = 4 * 2 = 8$$

$$\delta O_3 = a_3 * \Delta I = 6 * 2 = 12$$

$$\delta O_4 = a_4 * \Delta I = 7 * 2 = 14$$

The vector of numbers ($a_i$ coefficients) is all that is needed to relate the process dynamics of an output to an input. The unit input definitions are arbitrary and scaling factors and chosen to obtain $a_i$ coefficients, for example, in the range of 1 to 10. A unit input might be, for example, 2° F., 200 lb/hr., or 750 cu.ft./min.

Figure 2:
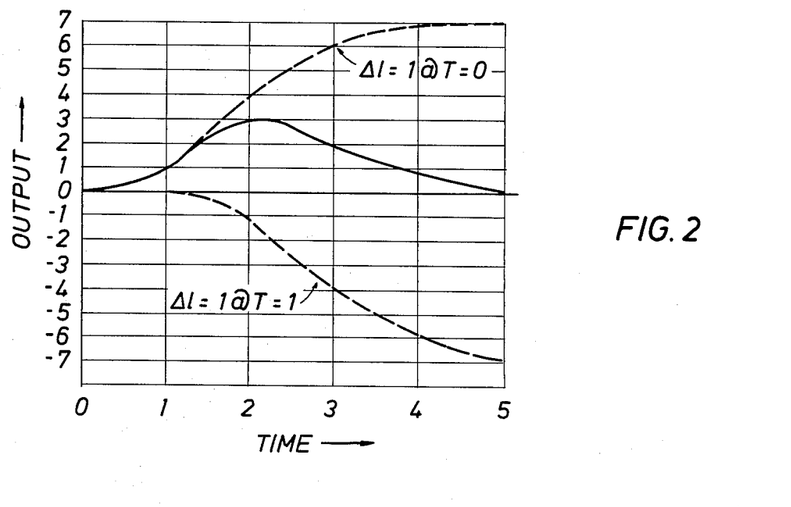
FIG. 2 is a graph showing the response of a system to unit inputs at two times.

The principle of superposition permits the system response to input changes during different time intervals to be obtained by adding the individual curves together. Using the response curve from FIG. 1, this concept is illustrated in FIG. 2 for a unit change in the input at time equal to zero and a negative unit change at the beginning of the second time interval. The dashed lines in FIG. 2 are the individual responses, which are added together to give the solid line that is the actual response. The $\delta O_i$ for example in FIG. 2 can be calculated by adding another column for the change in input in the second time interval to Equation (2). The second column contains the same vector of coefficients as the first shifted down one row.

$$
\begin{aligned}
\delta O_1 &= a_1 \Delta I_1 &&= 1*1 &&= 1 \\
\delta O_2 &= a_2 \Delta I_1 + a_1 \Delta I_2 &&= 4*1 + 1*(-1) &&= 3 \\
\delta O_3 &= a_3 \Delta I_1 + a_2 \Delta I_2 &&= 6*1 + 4*(-1) &&= 2 \\
\delta O_4 &= a_4 \Delta I_1 + a_3 \Delta I_2 &&= 7*1 + 6*(-1) &&= 1 \\
\delta O_5 &= a_5 \Delta I_1 + a_4 \Delta I_2 &&= 7*1 + 7*(-1) &&= 0
\end{aligned} \quad (3)
$$

The subscripts on the $\Delta I$'s indicate the beginning of the period at which the change is made in the input. The last time period considered is determined by the time required for the system to reach a steady state condition. The general set of equations for the single input/single output case is given by:

$$
\begin{aligned}
\delta O_1 &= a_1 \Delta I_1 \\
\delta O_2 &= a_2 \Delta I_1 + a_1 \Delta I_2 \\
\delta O_3 &= a_3 \Delta I_1 + a_2 \Delta I_2 + a_1 \Delta I_3 \\
&\vdots \\
\delta O_i &= a_i \Delta I_1 + a_{i-1} \Delta I_2 + a_{i-2} \Delta I_3 + \ldots
\end{aligned} \quad (4)
$$

The "dynamic matrix" of $a_i$ coefficients is created by shifting the same $a_i$ vector down one time period for each input period considered.

For the multiple input/single output case the concept is expanded as follows:

$$
\begin{aligned}
\delta O_1 &= a_1 \Delta I_1^1 + \quad\quad\quad\quad b_1 \Delta I_1^2 \\
\delta O_2 &= a_2 \Delta I_1^1 + a_1 \Delta I_2^1 + \quad b_2 \Delta I_1^2 + b_1 \Delta I_2^2 \\
\delta O_3 &= a_3 \Delta I_1^1 + a_2 \Delta I_2^1 + \ldots b_3 \Delta I_1^2 + b_2 \Delta I_2^2 \ldots \\
&\vdots \\
\delta O_i &= a_i \Delta I_1^1 + a_{i-1} \Delta I_2^1 + \ldots b_i \Delta I_1^2 + b_{i-1} \Delta I_2^2 + \ldots
\end{aligned} \quad (5)
$$

The $b_i$'s are the vector of numbers which relate the output to the vector of input variables $\Delta I^2$. The subscripts still refer to time, and the superscripts represent different input variables. An input variable may be a manipulated variable such as fuel flow to a furnace or an uncontrolled input, such as the temperature of the feed to a furnace or the flow into a fractionator. The introduction of uncontrolled inputs into the formulation provides the feedforward capabilities to the dynamic matrix control method. When updating the output projection vector, the uncontrolled inputs and the manipulated inputs are treated the same. The on-line computer saves the measured value for each input from the last time period and subtracts the measured input for the present. The change in each input is multiplied times its associated vector of dynamic coefficients to get the predicted change in the output vector for that input move. All of the new changes in the output vector (indicated by $\Delta O_1$) are summed together to obtain the predicted change in the output vector due to the change in inputs from the last time interval, i.e.

$$
\begin{aligned}
\Delta O_1 &= a_1 \Delta I^1 + b_1 \Delta I^2 + \ldots \\
\Delta O_2 &= a_2 \Delta I^1 + b_2 \Delta I^2 + \ldots \\
\Delta O_3 &= a_3 \Delta I^1 + b_3 \Delta I^2 + \ldots \\
&\vdots \\
\Delta O_i &= a_i \Delta I^1 + b_i \Delta I^2 + \ldots
\end{aligned} \quad (6)
$$

These $\Delta O_i$'s are then used to update the output projection vector.

When an output projection is started, the history of changes in the inputs is not known. The influence on the system's output of the unknown change in inputs will fade in time, which permits Equation (6) to be used to progressively improve the accuracy of the output projection vector.

The following calculational procedure for the projection vector will demonstrate the concept. First, initialize the output projection vector by setting all values equal to the observed value of the output. After the initialization, and at the beginning of all subsequent intervals of time, shift the projection forward one time interval. Any error in the projection of the output is used to offset the entire vector to obtain agreement with the observed output. Second, calculate the change in the inputs from the last time interval to the present. Third, calculate the change in the output vector by multiplying the change in the inputs times their respective set of dynamic coefficients, summing the results for each projection time, and finally adding those results to the shifted projection vector $P_i$ from the first step:

$$
\begin{aligned}
P_1 &= P_1^* + \Delta O_1 = P_1^* + a_1 \Delta I^1 + b_1 \Delta I^2 + \ldots \\
P_2 &= P_2^* + \Delta O_2 = P_2^* + a_2 \Delta I^1 + b_2 \Delta I^2 + \ldots \\
P_3 &= P_3^* + \Delta O_3 = P_3^* + a_3 \Delta I^1 + b_3 \Delta I^2 + \ldots \\
&\vdots \\
P_i &= P_i^* + \Delta O_i = P_i^* + a_i \Delta I^1 + b_i \Delta I^2 + \ldots
\end{aligned} \quad (7)
$$

Where $P_i^*$ is the projection vector from the last time interval, which has been updated based on the currently observed output. These steps are then repeated for the next interval. After the calculation has been repeated for a sufficient number of time intervals, the effect of initial condition selection will have been washed out in the projection vector. Similarly, the system will have had time to reach a steady state response with respect to the earlier inputs, and their effects will also be gone. The offsetting of the vector to match the most recent value of the observed output provides the feedback to the projection to accommodate disturbances, inputs which were not measured, and any errors which may exist in the dynamic analysis of the system. A digital computer is ideally suited to make these calculations since the scanning of the process usually occurs at fixed intervals of time and the control outputs are made at discrete time intervals.

Figure 3:
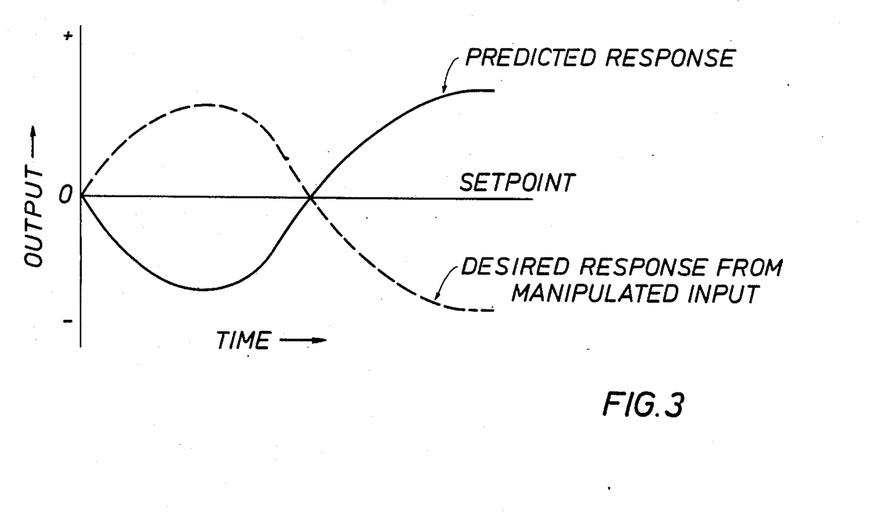
FIG. 3 is a graph illustrating that optimum control is obtained by finding a response from manipulated input that is the mirror image of the predicted response about the set point.

With the output projection known from measuring the change in inputs at each time interval, perfect control of the process would result if changes of the manipulated inputs in time could generate an output which formed the mirror image of the projection vector about the set point as illustrated in FIG. 3. Future changes in the manipulated input that generate a mirror image of the projection vector about the set point, would exactly cancel the projection vector and keep the system at its set point. To match the mirror image of the projection vector, the vector of errors, obtained by subtracting the projection vector from the set point, is set equal to the dynamic matrix and then solved for the changes in the manipulated inputs, i.e.

$$
\begin{aligned}
SP - P_1 &= e_1 = a_1 \Delta I_1 \\
SP - P_2 &= e_2 = a_2 \Delta I_1 + a_1 \Delta I_2 \\
SP - P_3 &= e_3 = a_3 \Delta I_1 + a_2 \Delta I_2 + a_1 \Delta I_3 \\
&\vdots \\
SP - P_i &= e_i = a_i \Delta I_1 + a_{i-1} \Delta I_2 + a_{i-2} \Delta I_3 \ldots
\end{aligned}
\quad (8)
$$

where SP is the set point and e is the error vector. Only one input is considered above for clarity, but the formulation also applies to multiple inputs.

In general, a unique solution to Equation (8) for the inputs does not exist. This is due to the fact that system response to the last manipulated input must have time to reach steady state. Hence, there will always be more equations than unknowns or, equivalently, the number of rows in the dynamic matrix will always be greater than the number of columns. A least squares approach is used to provide the set of manipulated inputs to keep the output at its set point. In addition, experience with dynamic matrix control indicates that the optimum solution may not always be practical from the standpoint of the size of the changes in input. In practice, a movement penalty on the input is used to moderate the size of the changes, which is accomplished by the addition of one row for each column:

$$
\begin{aligned}
e_1 &= a_1 \Delta I_1 \\
e_2 &= a_2 \Delta I_1 + a_1 \Delta I_2 \\
&\vdots \\
e_i &= a_i \Delta I_1 + a_{i-1} \Delta I_2 + \ldots a_{i-j+1} \Delta I_j \\
0 &= \lambda \Delta I_1 \\
0 &= \phantom{\lambda \Delta I_1} \lambda \Delta I_2 \\
&\vdots \\
0 &= \phantom{\lambda \Delta I_1 \lambda \Delta I_2} \lambda \Delta I_j
\end{aligned}
\quad (9)
$$

where j refers to the jth change in the input. The size of the penalty will be directly proportional to the λ since the equations are set equal to zero.

For multiple inputs and multiple outputs, the dynamic matrix is expanded as follows:

$$
\begin{aligned}
\delta O_1^1 &= a_1 \Delta I_1^1 \phantom{+ a_1 \Delta I_2^1} + b_1 \Delta I_1^2 \\
\delta O_2^1 &= a_2 \Delta I_1^1 + a_1 \Delta I_2^1 + b_2 \Delta I_1^2 + b_1 \Delta I_2^2 \\
&\vdots \\
\delta O_i^1 &= a_i \Delta I_1^1 + a_{i-1} \Delta I_2^1 + \ldots + b_i \Delta I_1^2 + b_{i-1} \Delta I_2^2 + \ldots \\
\delta O_1^2 &= c_1 \Delta I_1^1 \phantom{+ c_1 \Delta I_2^1} + d_1 \Delta I_1^2 \\
\delta O_2^2 &= c_2 \Delta I_1^1 + c_1 \Delta I_2^1 + d_2 \Delta I_1^2 + d_1 \Delta I_2^2 \\
&\vdots \\
\delta O_i^2 &= c_i \Delta I_1^1 + c_{i-1} \Delta I_2^1 + \ldots d_i \Delta I_1^2 + d_{i-1} \Delta I_2^2 + \ldots \\
0 &= \lambda_1 \Delta I_1^1 \phantom{xxxx} 0 \phantom{xxx} 0 \phantom{xxxx} 0 \\
0 &= 0 \phantom{xxxx} \lambda_1 \Delta I_2^1 \\
0 &= 0 \phantom{xxxxxxxx} \lambda_2 \Delta I_1^2 \\
0 &= 0 \phantom{xxxxxxxxxxxx} \lambda_2 \Delta I_2^2
\end{aligned}
\quad (10)
$$

where the $a_i$, $b_i$, $c_i$, and $d_i$ are the dynamic coefficients for $I^1$ and $I_2$, and the superscript on the $\delta O_i$ indicates a different output variable. As discussed hereinabove a multivariable dynamic system can be written as $$A \Delta I = e \quad (11)$$

where A contains the response matrix information with respect to all the input variables as described by Equation (10). In general, the A matrix is of size (M+N) X N. M, which is greater than N, is the number of points needed for the future most input for the process to reach steady state, and N is the number of future moves. ΔI is the input to the system which is to be calculated, that is, the vector of future moves of size N. The vector error projection of size (M+N) is indicated by e.

Since the formulation for single variables is the same as the multivariable case, the formulation will be given for a single input-output process without loss of generality.

It is desired to compute the least square solution of equation (11) with respect to the variable ΔI such that the sizes of the moves, the controlled variables and the manipulated variables are constrained as follows:

$$\Delta I_i \min \leq \Delta I_i \leq \Delta I_i \max \quad (12)$$

and $$C \Delta I \geq h \quad (13)$$

where C is the constraints matrix and h is the vector of constraints. The matrix C and the vector h of the constraints equation (13) have the following structures:

$$
C = \begin{bmatrix} 1_L \\ -1_L \\ A \\ -A \\ B \\ -B \end{bmatrix} \begin{array}{l} \text{input constraints} \\ \\ \text{output constraints} \\ \text{(controlled)} \\ \text{output constraints} \\ \text{(not controlled)} \end{array}
\quad (13a)
$$

$$
h = \begin{bmatrix} I_{low} - \bar{I} \\ \bar{I} - I_{high} \\ O_{low} - \bar{O} \\ \bar{O} - O_{high} \\ \beta_{low} - \bar{\beta} \\ \bar{\beta} - \beta_{high} \end{bmatrix}
\quad (13b)
$$

where $1_L$ is t matrix of input constraints, A is the matrix of output constraints (controlled), and β is the vector of output constraints (not controlled). $O_{low}$, $O_{high}$ and $\bar{O}$ are the low and high limits and the present projection of the controlled outputs. $\beta_{low}$, $\beta_{high}$ and $\bar{\beta}$ are the low and high limits and the present projection of the outputs which are not controlled. $I_{low}$, $I_{high}$ and $\bar{I}$ are the low and high limits and the present projection of the input variables. There are two types of input constraints for a typical control problem. The first type imposes a limit on how much each manipulated input can change in any time interval, and the second type limits the actual level of inputs to be implemented at present and future times. The first type can be accomplished by means of simple bounds in equation (12). The second type can be imposed using linear inequality constraints of the kind given by equation (13). The matrices $1_L$ and $-1_L$ in equation (13a) are designed for this purpose.

The matrix $1_L$ which is a lower triangular matrix of 1's is constructed such that the present and the future calculated moves are within the allowable limits. More precisely, when calculating N moves the value of the input actually implemented up to a given interval into the future can be given by $$I_n = \bar{I} + \sum_{i=1}^{n} \Delta I_i, \text{ for } n = 1, 2, \ldots, N \tag{13c}$$

where n denotes $n^{th}$ future interval and $\bar{I}$ is the value of the input at present. Using equation (13c) the present and the future values of the input can be constrained to any desired upper or lower bound as $$I_{low} \leq I_n \leq I_{high}, \text{ for } n = 1, 2, \ldots, N \tag{13d}$$

where $I_n$ is given by equation (13c). Equation (13c) can be written out for $n = 1, 2, \ldots, N$ as $$\begin{aligned} I_1 &= \bar{I} + \Delta I_1 \\ I_2 &= \bar{I} + \Delta I_1 + \Delta I_2 \\ &\vdots \\ I_N &= \bar{I} + \Delta I_1 + \Delta I_2 + \ldots + \Delta I_N \end{aligned} \tag{13e}$$

or in matrix form $$I = \begin{bmatrix} I_1 \\ I_2 \\ \vdots \\ I_N \end{bmatrix} = \begin{bmatrix} \bar{I} \\ \bar{I} \\ \vdots \\ \bar{I} \end{bmatrix} + \begin{bmatrix} 1 & & & \\ 1 & 1 & & \\ \vdots & & \ddots & \\ 1 & 1 & \ldots & 1 \end{bmatrix} \begin{bmatrix} \Delta I_1 \\ \Delta I_2 \\ \vdots \\ \Delta I_N \end{bmatrix} \tag{13f}$$

Letting the lower triangular matrix of 1's that appear in the right-hand side of the equation (13d) be denoted by $1_L$, then equation (13d) can be written conveniently as $$I_{low} - IR \leq 1_L \Delta I \leq I_{high} - IR \tag{13g}$$

where R is the identity matrix.

Equation (13g) can be divided into two parts to obtain the one sided inequality constraint which is required by the equation (13). The result is $$1_L \Delta I \geq I_{low} - \bar{I}R \tag{13h}$$

$$-1_L \Delta I \geq \bar{I}R - I_{high} \tag{13i}$$

This is the set of inequality constraints for the input which was given as part of the constraint matrix C in equation (13a).

There are also two types of output constraints: one for the controlled outputs and one for the uncontrolled outputs, i.e., associated variables. These two types of constraints are shown in construction of the constraint matrix C given by equation (13a). The controlled outputs and associated variables can be constrained at any time in future as follows:

(Controlled): $O_{low} < \bar{O} + A \Delta I < O_{high}$ (13j)
(Associated): $B_{low} < \bar{B} + B \Delta I < B_{high}$ (13k)

where the matrix A and vector $\bar{O}$ are defined as before; B and $\bar{B}$ are the Dynamic Matrix and past history with regard to associated variables respectively. The desired solution for $\Delta I$ in the least square sense is then the solution of the following minimization problem $$\underset{\Delta I}{\text{Minimize}} \; S = \tfrac{1}{2} \sum_{j=1}^{M} \rho_j^2 \tag{14}$$

subject to equations (12) and (13) where $$\rho_j = \sum_{i=i}^{N} A_{ji} \Delta I_i - e_j, j = 1, 2, \ldots, M \tag{15}$$

and A is the dynamic matrix, $\Delta I_i$ is the future moves of the variables and $e_j$ is the error vector.

Equation (14) can be written more conveniently in the vector notation as $$\underset{\Delta I}{\text{Minimize}} \; S = \tfrac{1}{2} \rho^T \rho \tag{16}$$

where the vector $\rho$ in equation (16), which is known as the residual, is given by $$\rho = A \Delta I - e \tag{17}$$

and $\rho^T$ means the transpose of the vector $\rho$. Substituting for $\rho$ from equation (17) in equation (16) gives $$\underset{\Delta I}{\text{Minimize}} \; S = \tfrac{1}{2} (A \Delta I - e)^T (A \Delta I - e) \tag{18}$$

expanding the right-hand side of equation (18) the result is $$\underset{\Delta I}{\min} \; S = \tfrac{1}{2} \Delta I^T (A^T A) \Delta I - (A^T e)^T \Delta I + \tfrac{1}{2} e^T e \tag{19}$$

Rearranging equation (19) by taking the constant term $e^T e$ from the right-hand side to the left-hand side provides the desired result $$\underset{\Delta I}{\min} \; (S - \tfrac{1}{2} e^T e) = \tfrac{1}{2} \Delta I^T (A^T A) \Delta I - (A^T e)^T \Delta I \tag{20}$$

by letting $$F = S - \tfrac{1}{2} e^T e \tag{21}$$

$$H = A^T A \text{ (symmetric)} \tag{22}$$

$$q = A^T e \tag{23}$$

$$x = \Delta I \tag{24}$$

it follows that the least square solution of equation (11) is the same as the quadratic programming solution of the following minimization problem $$\underset{x}{\text{Minimize}} \; F(x) = \tfrac{1}{2} x^T H x - q^T x \tag{25}$$

subject to $$Cx \geq h \tag{26}$$

and $$x_{min} \leq x \leq x_{max} \tag{27}$$

where

- $H = A^T A$ (symmetric matrix of size (NXN))
- $q = A^T e$ (gradient vector of size N)
- $x = \Delta I$ (vector of variables of size N)
- $C = C$ (constraint matrix of size (MXN))
- $h = h$ (vector of constraints of size M)
- $x_{max} = \Delta I_{max}$ (vector of the upper bounds for the variables of size N)
- $x_{min} = \Delta I_{min}$ (vector of the lower bounds for the variables of size N)

The constraints in equation (26) must be linear and can consist of upper and lower boundaries on inputs, controlled outputs and uncontrolled outputs.

The method of the present invention can also employ linear programming to minimize the predicted error subject to the input and output constraints. Linear programming solves the following optimization problem $$\text{Minimize } \phi = \sum_{i=1}^{N} a_i x_i \tag{28}$$

subject to $$\sum_{j=1}^{N} c_{ij} x_j = h_i \quad i = 1, 2, \ldots l \tag{29}$$

$$\sum_{j=1}^{N} c_{ij} x_j \leq h_i \quad i = l+1, l+2, \ldots, m$$

where
$x_j \geq 0$ and $j = 1, 2, \ldots, N$

The objective function, equation (28), and the constraints, equation (29), are all linear. In the above linear programming formulation:

- $\phi$ = The objective function equation (28)
- $a_i$ = Associated cost of the variable $x_i$-equation (28)
- $c_{ij}$ = The (i, j)$^{th}$ element of the constraints matrix C-equation (29)
- $h_i$ = The right-hand side of the $i^{th}$ constraints equation
- $x_i$ = The $i^{th}$ element of the optimization variables
- l = Number of equality constraints
- m = Total number of constraints, i.e., equalities plus inequalities To apply linear programming in the present method, the strategy is similar to the quadratic programming formulation. The basic dynamic matrix control equation is written and modified to utilize the linear programming structure given by the set of equations (28, 29).

The basic dynamic matrix control equation, which is given by Equation (11) is $$A\Delta I = e \tag{11}$$

Pre-multiplying this equation by $A^T$ yields $$A^T A \Delta I = A^T e \tag{30}$$

Equation (30) is a set of linear equations in n unknowns ($\Delta I_i$, i=1, 2, ..., n). Equation (30) is to be solved subject to the following set of linear constraints $$C\Delta I - h \geq 0 \tag{31}$$

One way to achieve the dynamic matrix control solution with linear programming is described hereinbelow; however, other linear programming formulations can be used. The following Lagrangian function is defined $$L(\Delta I, \mu) = \tfrac{1}{2} \Delta I^T (A^T A) \Delta I - (A^T e)^T \Delta I - \mu^T (C\Delta I - h) \tag{32}$$

Forming the necessary conditions for equation (32), that is, taking partial derivatives of the Lagrangian with respect to $\Delta I$ and $\mu$, the results are $$A^T A \Delta I - A^T e - C^T \mu = 0 \tag{33}$$

$$C\Delta I - h > 0$$

$$\mu \geq 0$$

where $\mu$'s are the Kuhn-Tucker multipliers. Ideally, these multipliers must be obtained such that $$\mu^T (C\Delta I - h) = 0 \tag{34}$$

This equation states that either a constraint is active ($c_{ij}\Delta I_i - h_j = 0$) or its multiplier vanishes; this equation is known as the Principle of Complementary Slackness. However, Equation (34) is nonlinear and cannot be implemented by a simple linear programming formulation.

Clearly, it is desired to drive the $\mu$'s to zero, if possible. Motivated by keeping these nonnegative $\mu$'s as small as possible, the following objective function is then defined for the direct linear programming implementation $$\text{Minimize } \Sigma \mu \tag{35}$$

Obviously, both the objective function, equation (35) and the constraint, equations (33), are linear and, therefore, can best be solved by a linear programming technique. These multipliers ($\mu$'s) may not be called Kuhn-Tucker multipliers anymore, since they may no longer strictly follow the nonlinear equality constraint (34). However, in practice, excellent results have been obtained using this simple linear programming formulation on dynamic matrix control problems in achieving the control policy requirement without violating any constraints.

The final complete linear programming formulation of the dynamic matrix control can now be writen as $$\text{Minimize } \Sigma \mu \tag{35}$$

subject to the equality constraints $$A^T A \Delta I - A^T e - C^T \mu = 0 \tag{36}$$

and the following inequality constraints $$C\Delta I \geq h \tag{37}$$

$$\Delta I_{min} \leq \Delta I \leq \Delta I_{max} \tag{38}$$

Equations (35) through (38) can be rewritten in a more typical linear programming notation by using the following simple transformation.

$$x = \Delta I - \Delta I_{min} \geq 0 \tag{39}$$

or $$\Delta I = x + \Delta I_{min} \tag{40}$$

By definition x is thus non-negative. In order to write the above equations into the linear programming code transformation, equations (39) and (40) must be used in all of the constraints possessing $\Delta I$ variables. The resulting equations can now be presented in the standard linear programming tableau as $$\text{Minimize} \quad \Sigma \mu \tag{42}$$

| x | $\mu$ | RHS | |
|---|---|---|---|
| $A^T A + \lambda R$ | $-C^T$ | $A^T e - A^T A + \lambda R \Delta I_{min}$ | (43) |
| R | 0 | $\Delta I_{max} - \Delta I_{min}$ | |
| C | 0 | $d - C \Delta I_{min}$ | |

When equations (42) and (43) are solved, the resulting x can be used in equation (40) to calculate $\Delta I$. In equation (43) the first matrix row is the equality constraints giving rise to the basic linear programming formulation of the dynamic matrix control. The second matrix row represents the upper limits on the variables, and the last matrix row is the inequality constraints imposed on the variables.

An alternative formulation of the linear programing solution of the dynamic matrix control problem is described hereinbelow.

Equation (31) consists of the following constraints: absolute value of $\Delta I$; high/low limits on the manipulative inputs; high/low limits on the controlled outputs; and high/low limits on the associated outputs.

Constraints on the absolute value of $\Delta I$ is accomplished with $$|\Delta I| \leq \Delta I_{max} \quad \Delta I_{max} \geq 0 \tag{44}$$

or $$-\Delta I_{max} \leq \Delta I \leq \Delta I_{max} \tag{45}$$

Since one of the prerequisites of a linear programming solution is that all $\Delta I$'s be greater than or equal to zero, the following transformation is defined $$x = \Delta I + \Delta I_{max} \tag{46}$$

The above inequality becomes $$x \leq 2\Delta I_{max} \tag{47}$$

The high/low limits on the manipulated inputs are enforced by $$I_{low} \leq \overline{I} + \Sigma \Delta I \leq I_{high} \tag{48}$$

where $I_{low}$ is the low limit on the absolute value of the manipulated input, $I_{high}$ is the absolute value of the manipulated input, and $\overline{I}$ is the present value of the manipulated input. Using the transformation defined by equation (46), equation (48) becomes $$1_L \cdot x \leq I_{high} - \overline{I} + 1_L \cdot \Delta I_{max} \tag{49}$$

and $$-1_L \cdot x \leq -I_{low} + \overline{I} - 1_L \cdot \Delta I_{max} \tag{50}$$

The high/low limits on the controlled output are defined as $$O_{low} \leq \overline{O} + A \Delta I \leq O_{high} \tag{51}$$

Again, equation (46) is utilized to obtain the following inequalities $$Ax \leq O_{high} - \overline{O} + A \Delta I_{max} \tag{52}$$

and $$-Ax \leq -O_{low} + \overline{O} - A \Delta I_{max} \tag{53}$$

The high/low limits on the associated output are handled by $$\beta_{low} \leq \overline{\beta} + B \Delta I \leq \beta_{high} \tag{54}$$

The matrix B relates to the changes in the associated output to changes of the manipulated input. Applying equation (46) results in $$Bx \leq \beta_{high} - \overline{\beta} + B \Delta I_{max} \tag{55}$$

and $$-Bx \leq -\beta_{low} + \overline{\beta} - B \Delta I_{max} \tag{56}$$

Let the vector of residuals $\sigma$ be defined by $$\sigma = A^T A \Delta T - A^T e \tag{57}$$

Then the folowing minimization problem can be set up to solve the desired control problem $$\text{Minimize } \Sigma |\sigma| \tag{58}$$

subject to constraints equation (37)

$$C \Delta I \leq h$$

Defining $\sigma = w - z$, where w and z are two non-negative vectors, the above minimization problem (equation (58)) can be written in a linear programming formulation as $$\text{Minimize } \Sigma(w+z) \tag{59}$$

subject to $$\sigma = A^T A \Delta I - A^T e = w - z \tag{59a}$$

$$w, z \geq 0$$

$$C \Delta I \geq h$$

Move suppression is accomplished as shown in equation (9). This results in adding $\lambda R$ to the diagonal of $A^T A$.

The foregoing equations can now be presented in a standard linear programming tableau as

| x | w | z | RHs(d) |
|---|---|---|---|
| $1_L$ | 0 | 0 | $I_{high} - \overline{I} + 1_L \cdot \Delta I_{max}$ |
| $-1_L$ | 0 | 0 | $-I_{low} + \overline{I} - 1_L \cdot \Delta I_{max}$ |
| R | 0 | 0 | $2 \Delta I_{max}$ |
| A | 0 | 0 | $O_{high} - \overline{O} - A \cdot \Delta I_{max}$ |
| $-A$ | 0 | 0 | $O_{low} + \overline{O} - A \cdot \Delta I_{max}$ |
| B | 0 | 0 | $\beta_{high} - \overline{\beta} + B \Delta I_{max}$ |
| $-B$ | 0 | 0 | $-\beta_{low} + \overline{\beta} - B \Delta I_{max}$ |
| $(A^T A + \lambda R)$ | $-R$ | R | $-A^T e - (A^T A + \lambda R) \cdot \Delta I_{max}$ |

The present invention can be used to drive the control to the optimum for a multivariable problem with more inputs than outputs. In this case the manipulated variables possess their own set point values which are based on some economic objectives. This economic objective may be the result of a simple linear programming subproblem for determining the optimum final values of the inputs. The inputs then can be regarded as controlled variables with their calculated optimum values as their set points. To illustrate this procedure, assume for simplicity a three input-two output system.

(1) Set up the following small linear programming subproblem:

$$\underset{I^*}{\text{Minimize }} \psi = \gamma_1 I^*_1 + \gamma_2 I^*_2 + \gamma_3 I^*_3 \qquad (60)$$

subject to
$$0_{1s} = g_{11} I^*_1 + g_{12} I^*_2 + g_{13} I^*_3 \qquad (61)$$
$$0_{2s} = g_{21} I^*_1 + g_{22} I^*_2 + g_{23} I^*_3$$
$$I_{min} \leq I^* \leq I_{max}$$

where, $\gamma_1$, $\gamma_2$ and $\gamma_3$ are some selected economic weights which are known a priori, $g_{ij}$ are the steady state gains and $O_{is}$ are the set point values for the controlled variables.

(2) Let $I_1^*$, $I_2^*$, and $I_3^*$, the solution of the above linear programming problem, be the steady state set point values for the inputs $I_1$, $I_2$, and $I_3$ respectively, then revise the original dynamic matrix A to include this information as follows:

$$A = \begin{bmatrix} A_{11} & A_{12} & A_{13} \\ A_{21} & A_{22} & A_{23} \\ 1^t & 0 & 0 \\ 0 & 1^t & 0 \\ 0 & 0 & 1^t \end{bmatrix} \qquad (62)$$

Where $A_{ij}$ is the dynamic matrix of $i^{th}$ output with respect to $j^{th}$ input and $1^t = [1,1,\ldots,1]$. the corresponding error vector for the above system is simply $$\hat{e}^t = [e_1^t, e_2^t, (I_1^* - \overline{I_1}), (I_2^* - \overline{I_2}), (I_3^* - \overline{I_3})] \qquad (63)$$

$e_1^t$ being the transpose of the $i^{th}$ output error vector. The new dynamic matrix, i.e., equation (11) becomes $$\hat{A} \Delta I = \hat{e} \qquad (64)$$

Figure 4:
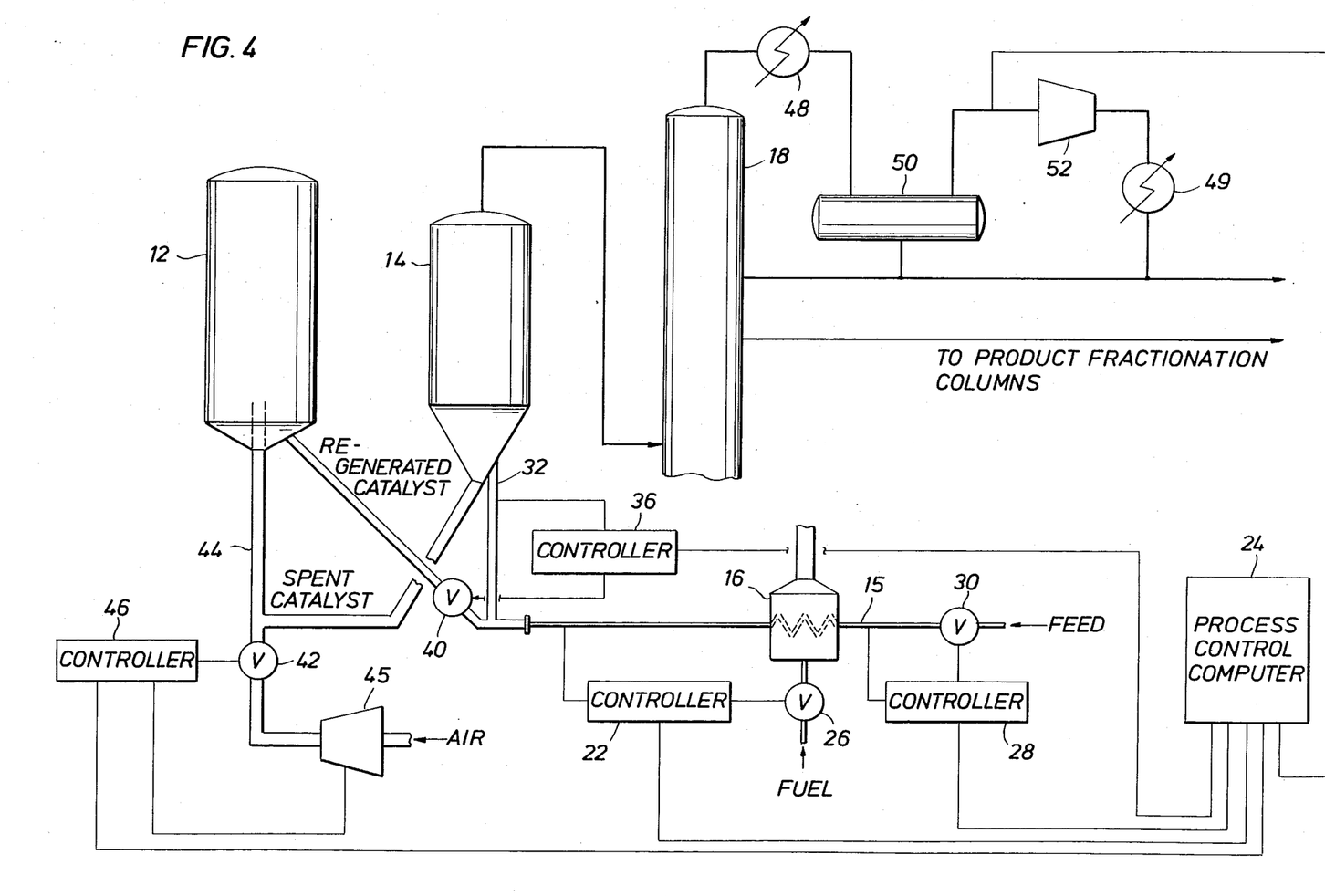
FIG. 4 respresents a typical plant process which can be controlled by the method of the present invention.

To facilitate an understanding of the invention, the method will be utilized to control a fluid catalytic cracking unit, such as those employed in an oil refinery. For ease of explanation, the system being controlled has two control variables or outputs, and four manipulated variables or inputs. However, it will be apparent that any number of controlled or manipulated variables may be utilized in the method of the present invention. Referring to FIG. 4, there is shown a fluid catalytic cracking unit, comprising a regenerator 12 which is used to burn the carbon deposits of the catalysts returning from reactor 14. In reactor 14, feed from furnace 16 is "cracked" in the presence of a catalyst to give a range of petroleum products. Main fractionator 18 and product fractionation columns (now shown) are used to separate out the various products. In a typical cycle of the CCU, fresh feed from line 15 enters furnace 16 and is heated to the desired temperature given by temperature controller 22. Temperature controller 22 senses the temperature of the feed outputted from furnace 16 and provides a signal indicative thereof to process control computer 24. Appropriate control signals, i.e., a set point, is provided by process control computer 24 to temperature controller 22 to operate valve 26 which controls the amount of fuel provided to furnace 16. Temperature controller 22 opens or closes valve 26 in order to maintain the temperature of the furnace at the set point supplied by process control computer 24. The temperature in furnace 16 is the first manipulated variable. The flow at the inlet of furnace 16 is sensed by flow controller 28, which provides a signal indicative thereof to process control computer 24. Flow controller 28 adjusts the opening of valve 30 to maintain the feed flow through line 15 into furnace 16 at the set point provided by the method of the present invention from process control computer 24. This flow or input to furnace 16 is the second of the manipulated variables. After the feed is heated to the desired temperature in furnace 16, it is outputted therefrom and mixed with recycled catalyst from regenerator 12 in riser 32. The amount of recycled catalyst combined with the feed from furnace 16 in riser 32 is controlled by controller 36. Controller 36 senses the temperature of the recycled catalyst combined with the feed in riser 32 and provides a signal indicative thereof to process control computer 24. In response to a control signal provided from process control computer 24, controller 36 modifies the opening of valve 40. The temperature of recycled catalyst mixed with feed in riser 32 is the third manipulated variable. The combined feedstream and catalyst from riser 32 enters reactor 14 where the cracking process continues. Spent catalyst from reactor 14 is recycled through line 44 to regenerator 12. air is also provided to line 44 by compressor 45; the amount of air provided to line 44 is sensed by controller 46 which provides a signal indicative thereof to process control computer 24. A set point signal is provided to controller 46 by process control computer 24, and controller 46 operates valve 42 to maintain the air flow at the set point. The amount of air provided to line 44 is the fourth manipulated variable; this air is used to burn the carbon deposits in regenerator 12 so that the catalyst can be recycled. To control the amount of carbon on the regenerator catalyst, which is the first controlled variable, controller 36 is utilized to maintain the temperature in riser 32 by allowing more or less catalyst circulation.

The output from reactor 14 is provided to main fractionator 18 which separates the reaction products. Main fractionator 18 passes the vapor products to heat exchanger 48 and light and heavy liquid products to the product fractionation columns. The output from heat exchanger 48 is provided to overhead accumulator 50 which passes the gaseous products to wet gas compressor 52 and passes one portion of the liquid products to the product fractionation columns and the other portion to main fractionator 18. The output of compressor 52 is first cooled by heat exchanger 49 and then provided to the product fractionation columns. In addition to controlling the carbon on the regenerated catalyst, the pressure on main fractionator 18, which is the second controlled variable, is controlled. This pressure indirectly maintains the pressure of reactor 14. The pressure in accumulator 50 or on the suction side of compressor 52 is provided to process control computer 24 as an indication of the pressure on main fractionator 18. In addition, the associated variables in this example, that is, the variables which are limited but not controlled, are the regenerator bed and the plenum temperature of regenerator 12 which has to be limited to avoid metallurgical problems, such as metal fatigue and so forth.

Furthermore, the system can be driven to an economic optimum as described hereinabove by maximizing the air provided in line 44.

The plant testing done prior to system implementation is accomplished by introducing a test disturbance, such as a step in each of the manipulated variables, one at a time, and recording the output for both controlled and associated variables for a period of time sufficiently long enough to allow the controlled and associated variables to reach a steady state. The $a_i$ coefficients for the dynamic matrix (dynamic coefficients) are determined from the test data. Alternatively, the plant testing can be done by employing plant models.

Figure 5A:
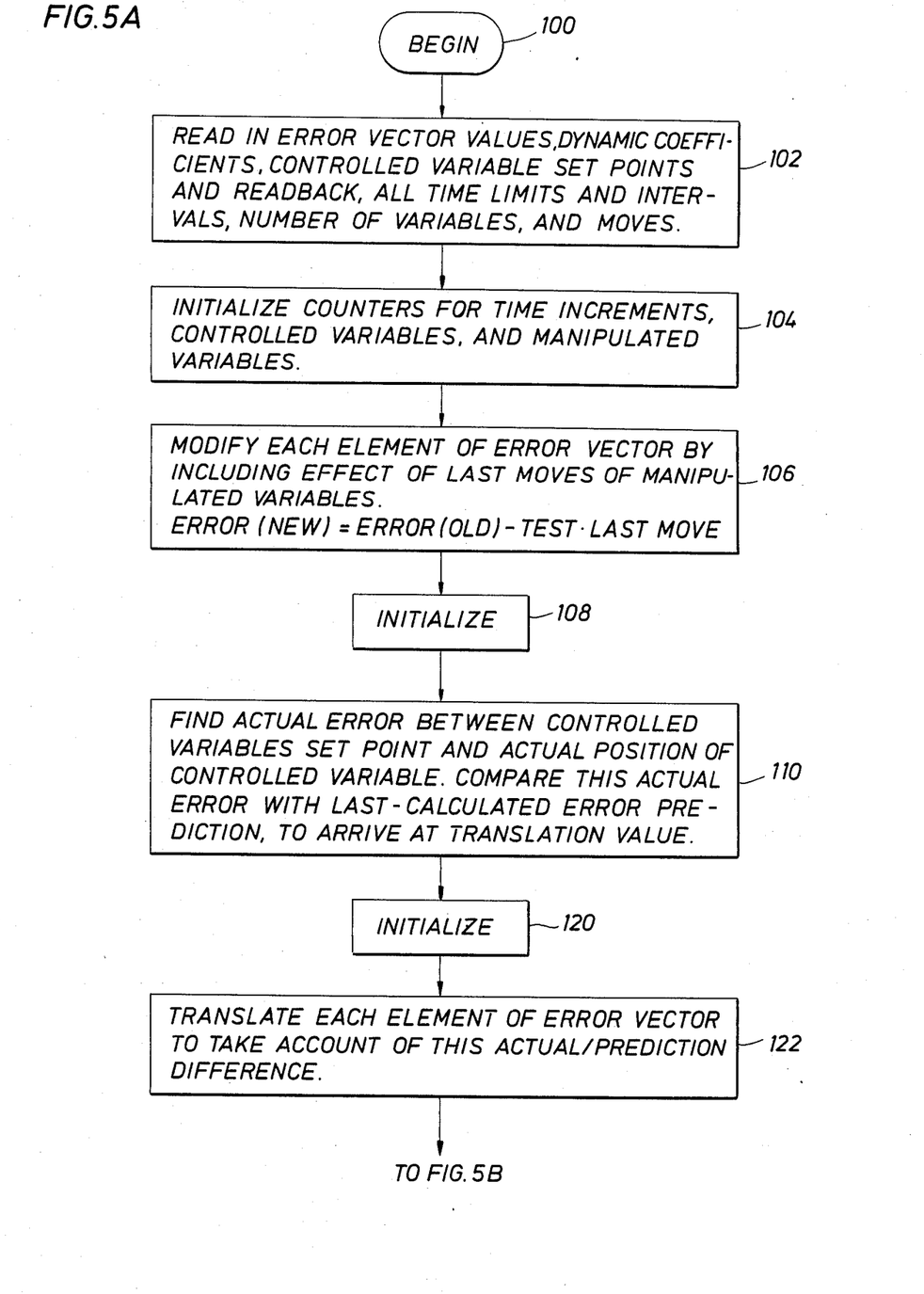
FIGS. 5A and 5B illustrate a flow chart for updating the error vector in the process control method of the present invention.
Figure 5B:
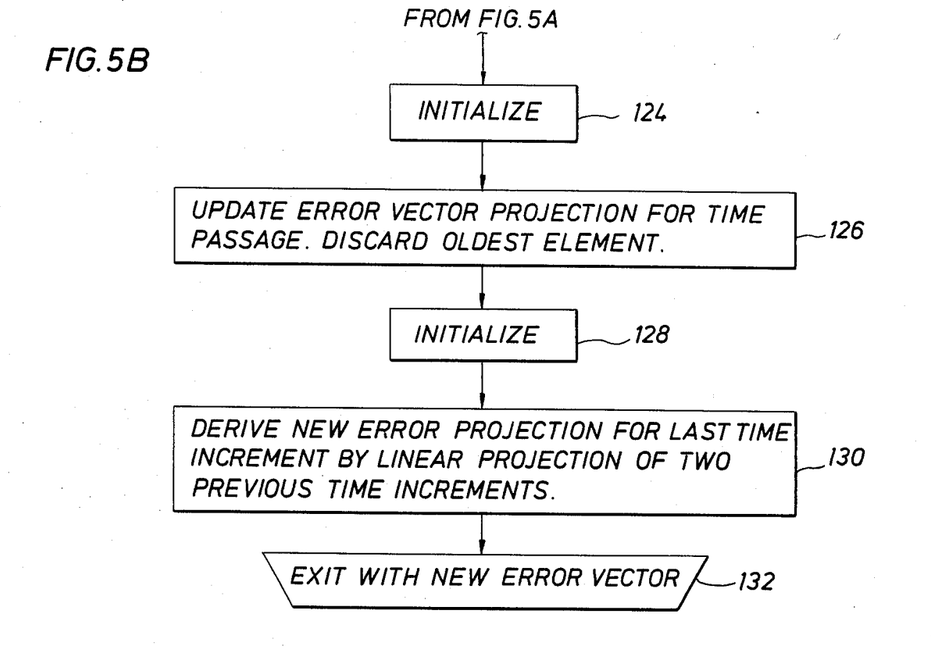
Figure 6:
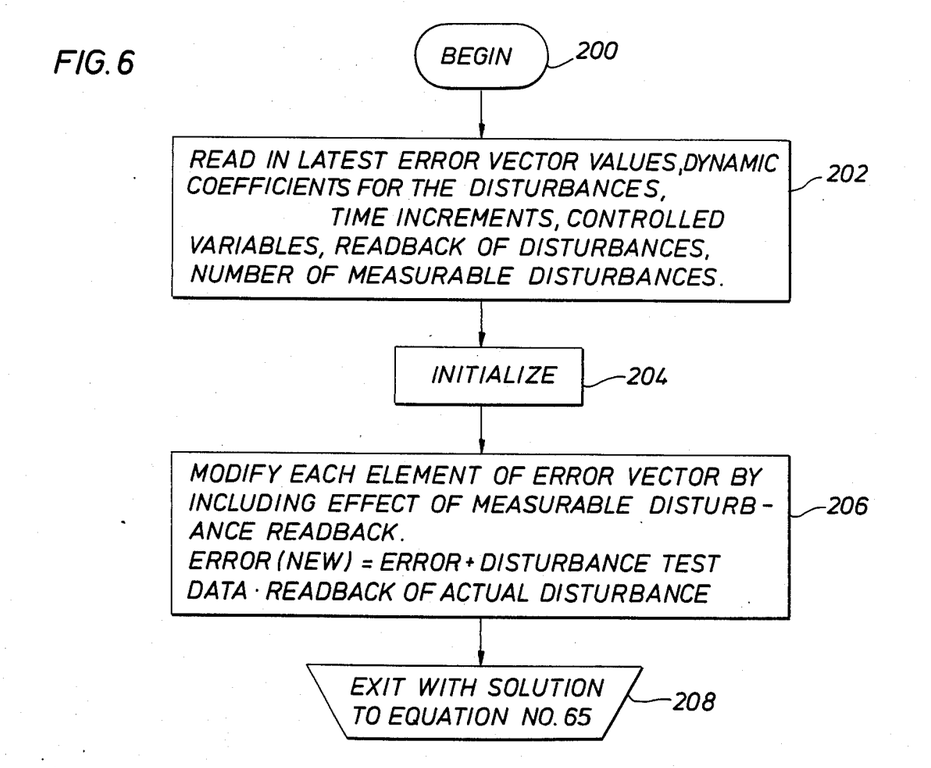
FIG. 6 illustrates a flow chart for including the effects of various measurable disturbances in the control technique.

Referring now to FIGS. 5A and 5B, and using the dynamic coefficients from the offline testing, various subroutines may be called in sequence by process control computer 24 of FIG. 4 to predict the proper moves that must be made for optimum control. The error vector is updated as follows:

$$e^{k+1} = e^k - A_1 \Delta I_1 + \bar{d} \cdot \delta \quad (65a)$$

$$e_j^{k+1} = e_{j+1}^k \quad j = 1, \ldots M - 1 \quad (65b)$$

$$e_M^{k+1} = 2e_{M-1}^{k+1} - e_{M-2}^{k+1} \quad (65c)$$

$$e_j^{k+1} = e_j^{k+1} + t \quad j = 1, \ldots M \quad (65d)$$

where $e^k$ = old error projection vector,
$e^{k+1}$ = new error projection vector,
$A_1$ = dynamic coefficients for manipulated input
$e_j^k$ = $j^{th}$ element of the error vector
$e_M^{k+1}$ = last element of the error vector obtained by linear extrapolation from the last two elements,
$\delta$ = change in the measured disturbance
$\bar{d}$ = vector of dynamic coefficients for the measured disturbance
$t = (SP^{new} - O^m) - e_1^{k+1}$, i.e., difference between process model and measurement plus the set point change,
$SP^{new}$ = current set point, and
$O^m$ = measured output At block 102 of FIG. 5A, data needed for the solution of equation (61) is collected. The last calculated error vector values, the dynamic coefficients from previous plant testing, controlled variable set points, readback, and specification of controlled system size and time periods are read into the memory of the computer. Block 104 represents the initialization of counters, which is necessary to facilitate the iterative calculations used to update each element of the error vector. The first series of calculations illustrated by block 104 modifies the old error vector for the effects of the last move. The dynamic coefficients are multiplied by the vector of the last set of moves made, and this quantity is subtracted from the last error vector, element by element, for each controlled and associated variable (equation (65a)). After initializing the counters at block 108, the real time error which currently exists between the actual position of the controlled variables and their predicted values is compared to block 110 with the last calculated error prediction, resulting in a translation value if a difference exists. This translation value is then added to each element of the error vector at block 122 to account for the difference between the actual and predicted error values (equation (65d)). After initialization of counters in block 124 of FIG. 5B, each element of this partially updated error vector is then updated for passage of time. This is accomplished by moving each element of the error vector for each of the controlled variables up one row and discarding the element representing present time (equation (65b)). The future most element in each vector remains the same except for the case where the output is characterized by an imbalance in the heat or material, then conventional linear extrapolation is used to determine the element representing the end of the projection, as indicated in block 130 (equation (65c)). The process control then exits from the subroutine at block 132 with the updated error vector which is then ready for processing through a second subroutine, shown in FIG. 6. Since measurable disturbances may or may not be present in a particular plant under control, the effects of these disturbances on the controlled process are included in the updated error vector through the separate subroutine of FIG. 6. This subroutine takes the latest updated error vector, that is, the error vector generated at block 132 of FIG. 5B, which is shown in block 202, and after initialization of counters in block 204, modifies each element of the error vector by adding a factor which is the product of the change in the disturbance and the dynamic coefficients for the disturbances which were gathered during testing (block 206). In this example no measurable disturbances were present, but it can be seen that for the purpose of this control technique, a measurable disturbance is treated in the procedure for updating the error projection in the same manner as the manipulated inputs. The final result of block 208 is the vector solution to equation (65).

Figure 7:
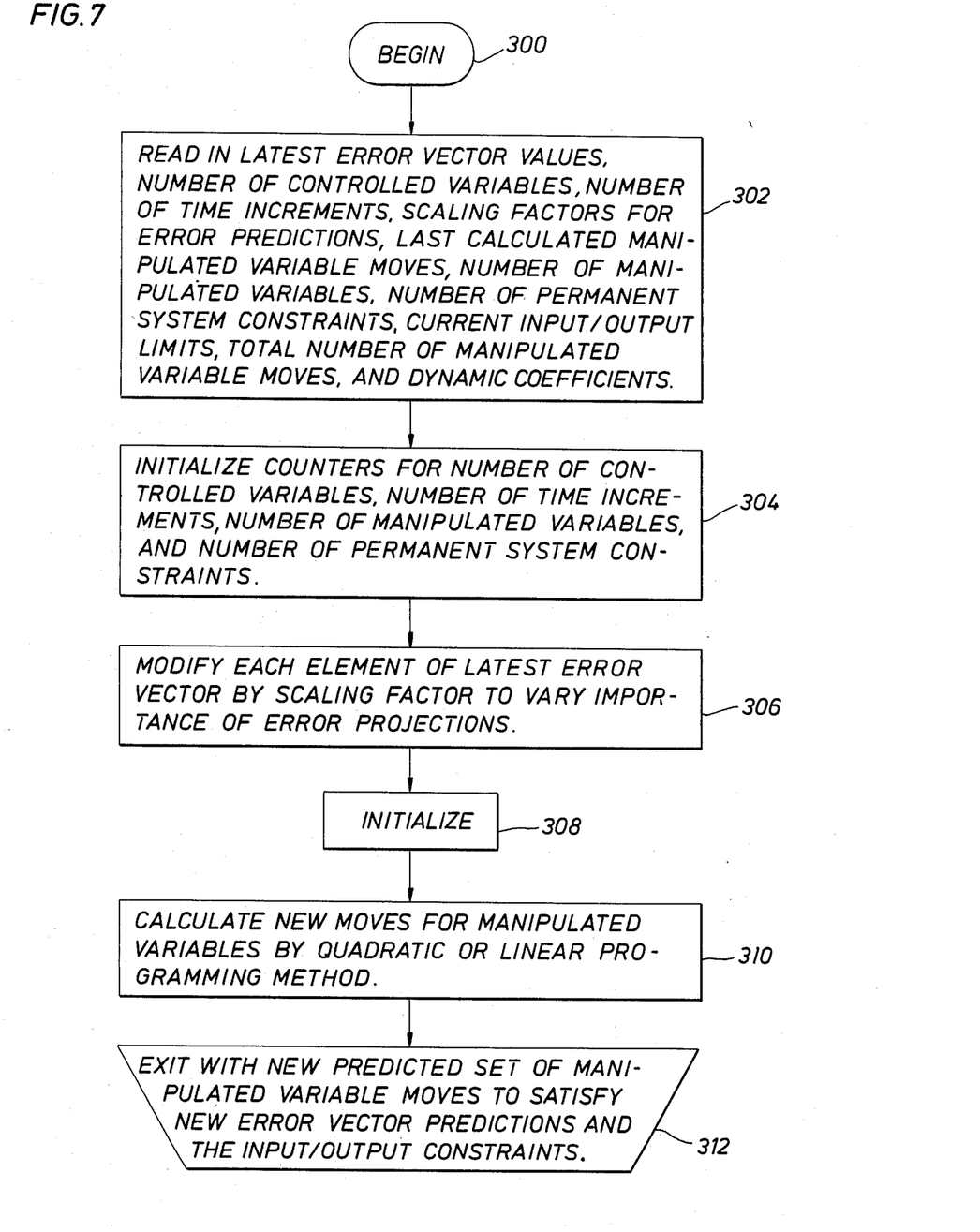
FIG. 7 illustrates a flow chart utilized to calculate a new set of moves for the updated error vector.

After evaluating and arriving at a new error vector, a set of moves must be calculated which are based on the projected errors; these moves are then transmitted to their respective manipulated variables, which were indicated in FIG. 4, for implementation and proper plant control. Referring to FIG. 7, a third subroutine calculates a set of moves to be carried out on the manipulated variables of FIG. 4, to satisfy the recently updated error vector, the permanent system constraints which were added during the off-line synthesis of the control technique and the current input/output limits. At block 302 projected error values of the controlled variables, dynamic coefficients determined during plant testing, specifications of controlled system size and time increments (such as number of time increments of error vector projection into the future, number of manipulated variables and controlled variables, number of moves to be calculated) and current input/output limits are read into the memory of the computer. At block 304, all of the necessary counters used in the move calculation are initialized. In block 306, each element of the latest set of error vectors is multiplied by a scaling factor which has the effect of varying the importance to proper plant control of the error projections. This revised set of error values is then used to calculate the new moves for the manipulated variables by either quadratic programming or linear programming, as described hereinabove, at block 310. The program then exits with the new predicted set of manipulated variables moves to satisfy the new error vector predictions in the input/output constraints. These moves are then implemented by the appropriate controllers in FIG. 4, in response to signals from process control computer 24.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method for controlling a process having a plurality of independently controllable, manipulable variables and at least one controllable variable dependent upon said independently controllable, manipulable variables, comprising:
gathering data about said process by separately introducing a test disturbance in each of said manipulable variables and measuring the effects of said disturbances on said at least one dependent controllable variable;
measuring the present values of said variables;
calculating for discrete intervals of time from said gathered data about said process, said measured present values, and preselected operating constraints a set of moves for at least said manipulable variables to obtain new values for said variables and to move said at least one dependent controllable variable towards at least one of said constraints; and
changing said process by adjusting said manipulable variables in accordance with a preselected portion of said set of moves to cause said process to move said at least one dependent controllable variable towards said at least one of said constraints.

2. A method as recited in claim 1, wherein said process comprises at least one uncontrolled variable that is dependent on said manipulable variables and wherein said step of calculating said set of moves further comprises calculating said set of moves such that said uncontrolled variable is limited to a predetermined constraint.

3. A method as recited in claim 2, wherein said step of calculating said set of moves further comprises calculating said set of moves such that at least one of said manipulable variables is limited to a predetermined constraint.

4. A method as recited in claim 1, wherein said step of calculating said set of moves comprises calculating said set of moves employing quadratic programming techniques.

5. A method as recited in claim 4, wherein said step of calculating said set of moves further comprises calculating said set of moves such that at least one of said manipulable variables is limited to a predetermined constraint.

6. A method as recited in claim 4, wherein said process comprises at least one uncontrolled variable that is dependent on said manipulable variables and wherein said step of calculating said set of moves further comprises calculating said set of moves such that said uncontrolled variable is limited to a predetermined constraint.

7. A method as recited in claim 1, wherein said step of calculating said set of moves comprises calculating said set of moves employing linear programming techniques.

8. A method as recited in claim 7, wherein said step of calculating said set of moves further comprises calculating said set of moves such that at least one of said manipulable variables is limited to a predetermined constraint.

9. A method as recited in claim 7, wherein said process comprises at least one uncontrolled variable that is dependent on said manipulable variables and wherein said step of calculating said set of moves further comprises calculating said set of moves such that said uncontrolled variable is limited to a predetermined constraint.

10. A method as recited in claim 1, wherein said step of calculating said set of moves further comprises calculating said set of moves such that at least one of said manipulable variables is limited to a predetermined constraint.

11. A method as recited in claim 10, wherein said process comprises at least one uncontrolled variable that is dependent on said manipulable variables and wherein said step of calculating said set of moves further comprises calculating said set of moves such that said uncontrolled variable is limited to a predetermined constraint.

12. A method for controlling a process having a plurality of independently controllable, manipulable variables and at least one controllable variable dependent upon said independently controllable, manipulable variables, comprising:
gathering data about said process by separately introducing a test disturbance in each of said manipulable variables and measuring the effects of said disturbances on said at least one dependent controllable variable;
measuring the present values of said variables at a first time;
calculating for discrete intervals of time from said gathered data about said process, said measured present values, and preselected operating constraints a first set of moves for at least said manipulable variables to obtain new values for said variables and to move said at least one dependent controllable variable towards at least one of said constraints;
changing said process by adjusting said manipulable variables in accordance with a preselected first portion of said first set of moves to cause said process to move said at least one dependent controllable variable towards at least one of said constraints; and
measuring said present values at least at a second time, calculating at least a second set of moves, and changing said process at least in accordance with a preselected portion of said at least second set of moves.

13. A method of controlling a process having a plurality of independently controlled, manipulated variables and at least one controlled variable dependent on said manipulated variables, said method comprising the steps of:
gathering data about said process by introducing test disturbances in said manipulated variables and measuring the effect of the disturbances on said controlled variable;
measuring the values of said variables at a first time;
calculating from said gathered data and said measured values of said variables at said first time a first set of changes in at least one of said manipulated variables such that said controlled variable is driven towards its set point without exceeding a predetermined limit;
adjusting said manipulated variables in accordance with at least one change from said first set of calculated changes;
measuring the values of said variables at a second time;

calculating from said gathered data, said first set of changes and said measured values at said second time a second set of changes in at least one of said manipulated variables such that said controlled variable is driven towards its set point without exceeding a predetermined limit; and adjusting said manipulated variables in accordance with at least one change from said second set of calculated changes.

* * * * *